United States Patent

Rochelle

[11] Patent Number: 5,775,743
[45] Date of Patent: Jul. 7, 1998

[54] NUT AND SPLIT RING ASSEMBLY

[76] Inventor: Gary P. Rochelle, 4316 Marina City Dr., #721, Marina del Rey, Calif. 90292

[21] Appl. No.: 768,779

[22] Filed: Dec. 13, 1996

Related U.S. Application Data

[63] Continuation of Ser. No. 544,273, Oct. 17, 1995, abandoned.
[51] Int. Cl.⁶ .................................................. F16L 17/06
[52] U.S. Cl. ................ 285/349; 285/148.13; 285/354; 285/379; 285/388
[58] Field of Search .......................... 285/388, 379, 285/349, 354, 148.13

[56] References Cited

U.S. PATENT DOCUMENTS

| | | |
|---|---|---|
| 1,201,022 | 10/1916 | Conniff . |
| 1,244,100 | 10/1917 | Kortas . |
| 2,112,290 | 3/1938 | Holland . |
| 2,474,178 | 6/1949 | Wurzburger . |
| 2,640,716 | 6/1953 | Bigelow . |
| 3,113,792 | 12/1963 | Brown .................... 285/388 X |
| 3,243,209 | 3/1966 | Chertok . |
| 3,515,415 | 6/1970 | Clark et al. . |
| 4,047,743 | 9/1977 | Weintraub et al. . |
| 4,050,722 | 9/1977 | Berger .................... 285/388 X |
| 4,516,278 | 5/1985 | Lamond . |
| 4,623,123 | 11/1986 | Traylor .................... 285/388 X |
| 4,676,479 | 6/1987 | Ogawa et al. ........... 285/388 X |
| 4,778,204 | 10/1988 | Berger . |
| 4,801,158 | 1/1989 | Gomi . |
| 5,092,636 | 3/1992 | Judge ..................... 285/379 X |
| 5,213,375 | 5/1993 | Wu . |
| 5,308,122 | 5/1994 | Crawford et al. . |
| 5,409,337 | 4/1995 | Muyskens et al. ....... 285/379 X |

FOREIGN PATENT DOCUMENTS

| | | | |
|---|---|---|---|
| 4206309 | 9/1993 | Germany .............. 285/388 |
| 807719 | 1/1959 | United Kingdom .... 285/388 |

*Primary Examiner*—Dave W. Arola
*Attorney, Agent, or Firm*—Christensen O'Connor Johnson & Kindness PLLC

[57] ABSTRACT

An apparatus for fluidly coupling a flanged pipe (2) having an annular flange (4) to a threaded pipe (22) having an externally threaded end (20) with an annular lip is disclosed. An annular nut (8) has an internal thread (10) for engaging the threaded pipe. An internal diameter of the annular nut is larger than an external diameter of the flange of the flanged pipe. Thus, the annular nut can slide without deformation over the flange of the flanged pipe. The annular nut also acts as a retaining surface. An internal diameter of an annular insert (12) is smaller than the external diameter of the flange of the flanged pipe. Because of the difference in diameter, the annular insert cannot slide freely over the flange of the flange pipe. Additionally, the annular insert has a split (14) that allows the annular insert to reversibly expand to slip over the flange of the flanged pipe. The annular insert bears against the retaining surface of the annular nut and the flange of the flanged pipe when the annular nut and the annular insert have both been slid over the flange of the flanged pipe. When threaded onto the threaded pipe, the annular nut is retained on the flanged pipe by the annular insert that prevents the annular nut from sliding over the flange of the flanged pipe.

12 Claims, 3 Drawing Sheets

NUT AND SPLIT RING ASSEMBLY

This application is a continuation application of application Ser. No. 08/544,273, filed on Oct. 17, 1995 now abandoned.

FIELD OF THE INVENTION

This invention pertains to pipe fittings, and, more particularly, fittings for coupling a flanged pipe to a threaded pipe.

BACKGROUND OF THE INVENTION

When assembling pipe for fluid equipment manufacture, plumbing, and other applications, it is often necessary to couple a flanged pipe to a threaded pipe. The conventional method of joining a flanged pipe to a threaded pipe utilizes a nut that is retained on the flanged pipe by the flange and that threads onto the threaded pipe thereby drawing and securing the two pipes together. The nut cannot be slipped over the flange of the flanged pipe because the nut's internal diameter is smaller than the flange diameter. This may cause difficulties during assembly because sliding the rest onto the flanged pipe requires that the opposite end of the pipe be freely accessible. Thus the flanged pipe may need to be removed from a larger assembly to install the nut. The fixed pipe may be covered by plaster, or may be inaccessible, or may be difficult to loosen because of corrosion buildup.

There have been attempts in the prior art to remedy this problem. One example of a previously available nut configuration is shown in U.S. Pat. No. 4,516,278 to Lamond. Lamond discloses a plumbing trap for connecting a flanged pipe to a threaded pipe. Lamond uses a nut that has two opposed locking ears that extend inward. The locking ears engage the flange of the flanged pipe by temporarily deforming and snapping over the flange of the flanged pipe. Lamond also discloses a ferrule and a split brass washer that are received in the nut between the ends of the flanged pipe and the threaded pipe for sealing.

Clark et al., U.S. Pat. No. 3,515,415, disclose a split nut that can temporarily expand and slide over the flange of the flanged pipe. Clark et al. uses a collar that is placed around the split nut to prevent the split nut from expanding.

U.S. Pat. Nos. 1,244,100 and 1,201,022 to Kortas and Conniff, respectively, both disclose pipe coupling nuts that are cut in two halves lengthwise for fitting over the end of the flanged pipe. U.S. Pat. No. 4,047,743 to Weintraub et al. discloses a split ring. However, the split ring is for compressing against, and engaging the outer circumference of a pipe, rather than sliding over a flange.

Thus, conventional solutions to the problem of placing a nut on a flanged pipe utilize a nut that must be deformed in order to accommodate the coupling between the flanged pipe and the threaded pipe. It is desirable to have a nut that works without deformity. As will be discussed below, the present invention discloses a nut that works without deformity to couple a flanged pipe to a threaded pipe.

SUMMARY OF THE INVENTION

A plumbing assembly for coupling a flanged pipe having an annular flange to a threaded pipe having an externally threaded end with an annular lip is provided. The plumbing assembly includes an annular nut having an internal thread for engaging the threaded pipe. An internal diameter of the annular nut is larger than an external diameter of the annular flange of the flange pipe. Thus, the annular nut can slide without deformation over the annular flange of the flanged pipe. The annular nut also forms an internal retaining surface. An internal diameter of an annular insert is smaller than the external diameter of the annular flange of the flanged pipe. Because of the difference in diameter, the annular insert cannot freely slide over the annular flange of the flanged pipe. The annular insert, however, has a split that allows the annular insert to reversibly expand to slip over the flange of the flanged pipe. The annular insert bears against the retaining surface of the annular nut and the annular flange of the flanged pipe when the annular nut and the annular insert have both been slid over the flange of the flanged pipe. Subsequently, the annular nut is screwed onto the threaded pipe. The annular insert prevents the annular nut from sliding over the flange of the flanged pipe. The apparatus also has a gasket. The gasket has an integral annular sealing projection. The gasket is generally positioned between the annular flange of the flanged pipe and the annular lip of the threaded pipe.

BRIEF DESCRIPTION OF THE DRAWINGS

The foregoing aspects and many of the attendant advantages of this invention will become better understood by reference to the following detailed description, when taken in conjunction with the accompanying drawings, wherein.

DETAILED DESCRIPTION OF THE PREFERRED EMBODIMENT

Figure 1:
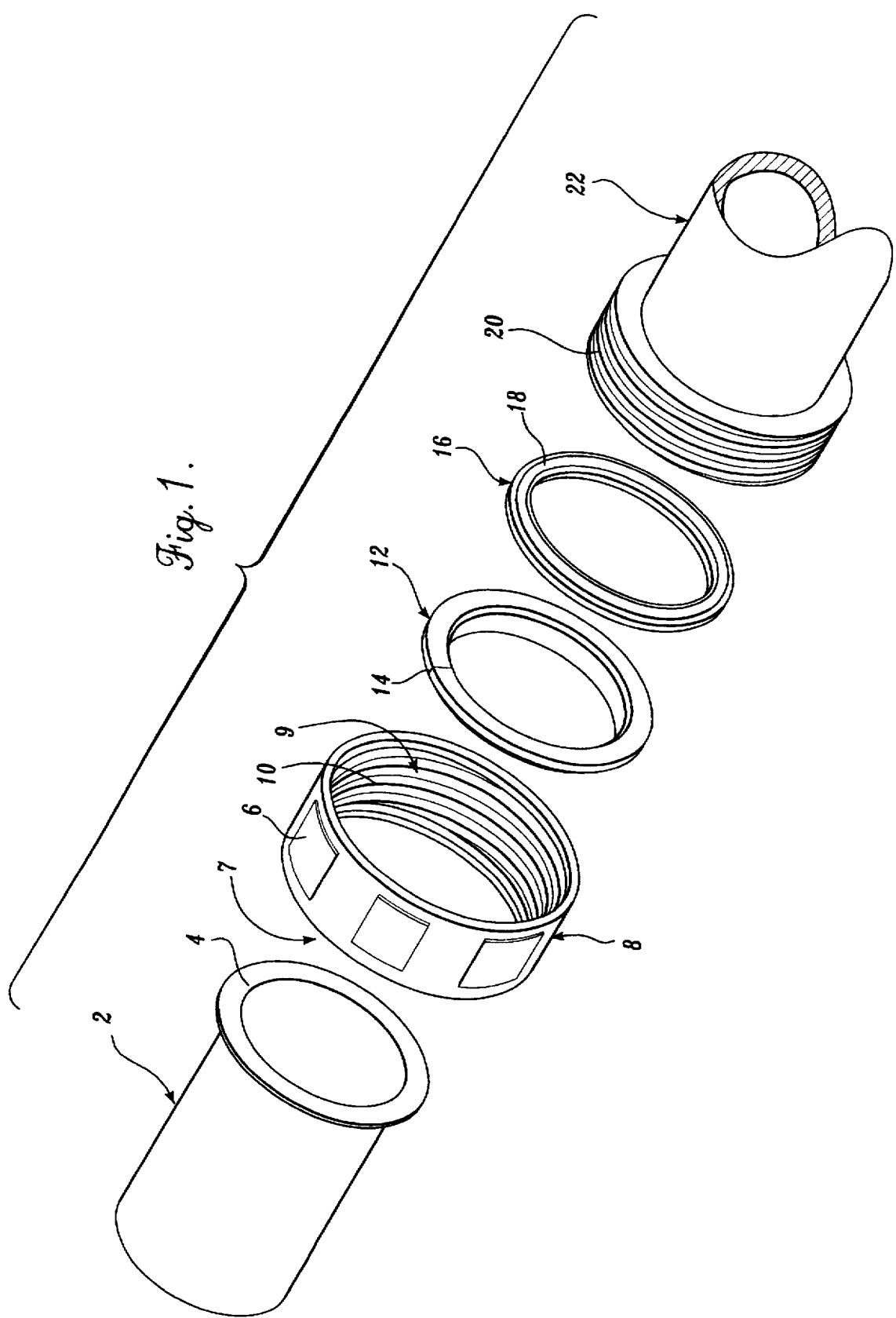
FIG. 1 is an exploded perspective view of the entire plumbing assembly including pipes to be joined.

FIG. 1 illustrates a flanged pipe 2 having a distal annular flange 4 is to be coupled to a threaded pipe 22 having an external threaded end 20. A preferred embodiment of a plumbing assembly constructed in accordance with the present invention for coupling the flanged pipe 2 to the threaded pipe 22 includes an annular nut 8, an annular insert 12, and a gasket 16.

The annular nut 8 of the present invention can be used in a broad variety of plumbing applications, including industrial, marine and residential pipe installations, and in the manufacture of equipment containing fluid lines. For example, the nut 8 is well suited for use in hot tubs or spas having pipes made of polyvinylchloride (PVC) for rotating water through a heater. For such use, the annular nut 8 and the insert 12 are suitably made of polyvinylchloride or other thermoplastics, such as Nylon™ polyamide or acrylonitrile-butadiene-styrene (ABS) polymers.

Figure 2:
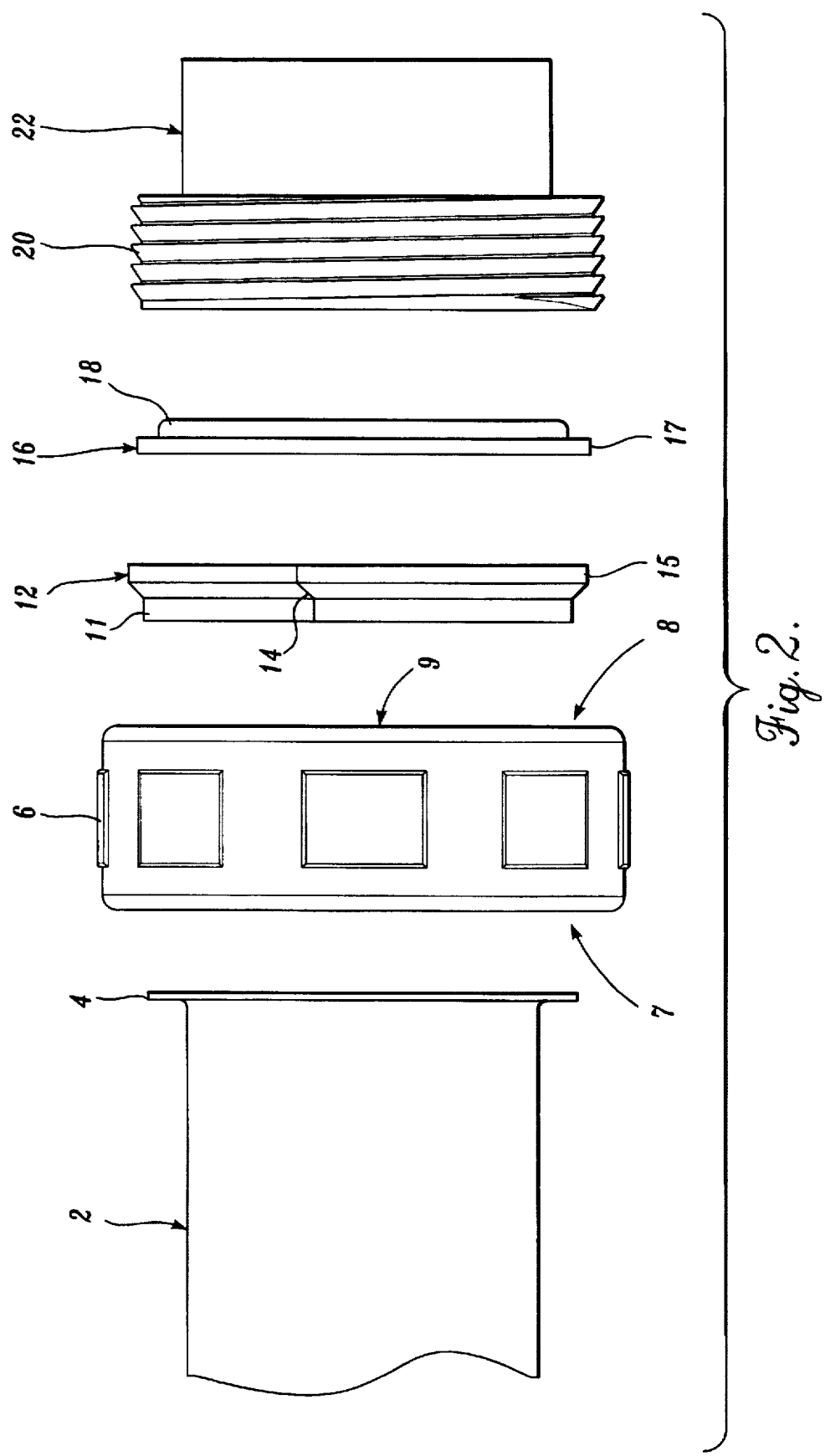
FIG. 2 is an exploded side view of the plumbing assembly of FIG. 1.

The annular nut 8 has a number of rectangular projections 6 on its exterior surface. These projections 6 are regularly located and equivalently spaced on the exterior surface of annular nut 8. The projections 6 provide a surer grip of the annular nut 8. The interior of the annular nut 8 defines an internal thread 10, as shown in FIG. 1. The annular nut 8 also has a first end opening 7 a second end opening 9. The first end opening 7 faces the distal annular flange 4 of the flanged pipe 2. The other second end opening 9 faces the annular insert 12 and threaded pipe 22. Referring to FIG. 2, the first and second end openings 7 and 9 have diameters large enough that the annular nut 8 may slip freely without distortion over the distal annular flange 4 of the flanged pipe 2.

The annular insert 12 has a base portion 11 disposed during installation to face the flanged pipe 2 and a larger annular extension portion 15 facing the threaded pipe 22, with the outside surface of the insert 12 tapering therebetween. The diameter of the second end opening 9 of the nut 8 is larger than the diameters of the base portion 11 and the extension portion 15 of the annular insert 12. Thus, the annular insert 12 may be inserted entirely into the nut 8.

Referring to FIG. 2, the annular insert 12 has an internal diameter that is too small to slip over the annular flange 4 of the flanged pipe 2 without deformation. However, the annular insert 12 includes a radially oriented split 14 which allows the annular insert 12 to temporarily expand to slip over the flange 4. The insert 12 is suitably manufactured from a semirigid structural material having a predetermined degree of resiliency to permit this limited deformation without cracking. Suitable materials are thermoplastic polymers such as PVC, polyamide and ABS.

The first end opening 7 of the nut 8 is sized to receive the base portion 11 of the annular insert 12, but to retain the extension portion 15 of the insert 12 within the interior of the nut 8. This enables the nut 8 and insert 12, when assembled with the insert 12 received within the nut 8, to cooperatively form a nut assembly that is operably retained on the flanged pipe 2. The nut 8 surrounds and prevents flexure of the insert 12 that would otherwise permit the insert 12 to expand, as shall now be explained.

Figure 3:
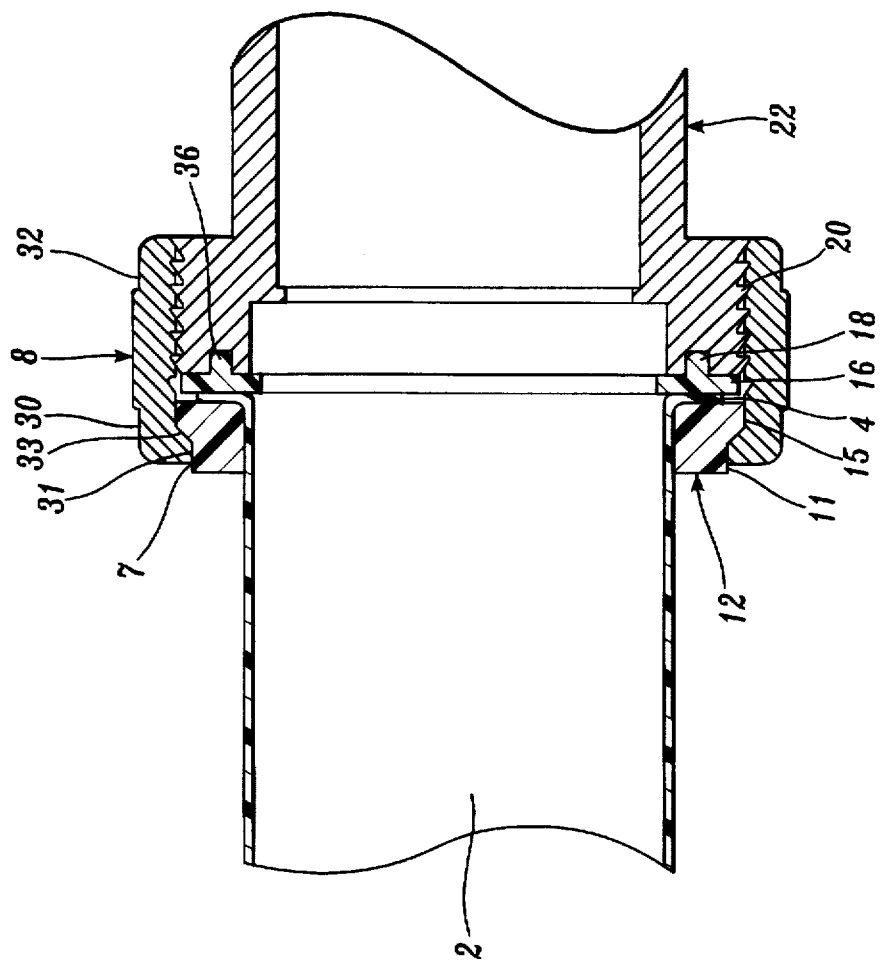
FIG. 3 is a cross-sectional side view of the plumbing assembly of FIG. 1 taken along the longitudinal axis of the plumbing assembly showing the threaded engagement of the plumbing assembly and the joined pipes.

As shown in FIG. 3, the annular nut 8 includes an internal retaining section 30 and an internal threaded section 32. The retaining section 30 captures the insert 12 for cooperative mating with the flange 4 of the flanged pipe 2. The threaded section 32, which defines the internal thread 10, threadably engages the externally threaded end 20 of the threaded pipe 22. The retaining section 30 includes an annular lip 31 which projects inwardly and defines an annular internal beveled retaining surface 33 and the first end opening 7. The internal diameter of the first end opening 7 is smaller than the internal diameter of the threaded section 32.

When the annular insert 12 is inserted into the annular nut 8, it is first passed through the threaded section 32 and then into the retaining section 30. However, the annular insert 12 cannot slide entirely through the retaining section 30. The retaining surface 33 of the annular lip 31 prevents further advancement by bearing against the insert 12 at the tapered transition between the extension portion 15 and base portion 11 of the insert 12. Only the annular base portion 11 of the annular insert 12 passes through the annular lip 31. The annular extension portion 15 thus bears against the lip 31 to capture the insert 12.

As shown in FIG. 2, the gasket 16 includes a flat annular base 17. An integrally formed annular O-ring projection 18 projects from one flat side of the annular base 17. The O-ring projection 18 has a semi-cylindrical cross-sectional profile. When the nut 8 and insert 12 are assembled on the pipes 2 and 22, the gasket 16 is received between the flange 4 of the pipe 2 and the end face of the threaded pipe 22. The integral O-ring projection 18 faces the threaded pipe 22, and is received within an annular groove 36 formed in the end face thereof. The dimensions of the O-ring projection 18 and groove 36 are determined as well known by those of ordinary skill in the art to make a seal that enhances the sealing ability of the gasket 16. The gasket is made up of an elastomeric material such as nitrile rubber, and serves as a one-piece combination gasket and O-ring.

In practice, the annular nut 8 is first slid over the annular flange 4 onto the main body portion of the flanged pipe 2 as shown in FIG. 3, so that the larger diameter section 32 of the annular nut 8 is closest to the annular flange 4. Thereafter, the annular insert 12 is slid over the annular flange 4 by resiliently deforming the insert to form a gap at the split 14. Once passing over the flange 4, the annular insert 12 returns to its original shape and closes the split 14. Next, the gasket 16 is inserted into the threaded section 32 of the annular nut 8. The gasket 16 bears against the annular flange 4. Finally, the annular nut 8 is threadably secured to the externally threaded end 20 of the threaded pipe 22, with the annular insert 12 captured by the smaller diameter section 30 of the annular nut 8. Since the external diameter of the annular insert 12 is too large to slide through the smaller diameter section 30 in the central passage in the annular nut 8, the annular nut 8 causes the annular insert 12 to bear against the annular flange 4 and hold the flanged pipe 2 against the threaded pipe 22.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A plumbing assembly for fluidly coupling a flanged pipe having an annular flange to a threaded pipe having an externally threaded end, comprising:

an annular nut having a central passage defining a minimum internal diameter sized greater than an external diameter of the flange of the flanged pipe such that said annular nut can slide without deformation over the flange, and including a retaining section defining a retaining surface and an internally threaded section for engaging the threaded pipe; and an annular insert having a minimum internal diameter sized less than the external diameter of the flange of the flanged pipe such that said annular insert cannot freely slide over said flange of said flanged pipe, said annular insert having a single split that allows said annular insert to undergo uniform elastic deformation and slip over said flange of said flanged pipe and then return to an undeformed annular shape, said annular insert bearing against the retaining surface of said annular nut and the flange of the flanged pipe when said annular nut and said annular insert have both been slid over said flange of said flanged pipe and said annular nut is threadedly engaged with the threaded pipe, said annular insert securing said annular nut from sliding over the flange of the flanged pipe, said annular insert having an annular base portion that is received within the retaining section of the nut and a larger annular extension portion defining an outside diameter that is substantially equal to an inside diameter of the internally threaded section of the nut and that freely slides within the internally threaded section of the nut and is closely received therein.

2. A plumbing assembly as claimed in claim 1, wherein: said annular nut having a large internal diameter section and a small internal diameter section, said large internal diameter section defining the internal thread for threadable engagement to the externally threaded end of the threaded pipe, said small internal diameter section defining the retaining surface.

3. The plumbing assembly of claim 1, wherein said annular insert is formed from a resilient structural material.

4. A plumbing assembly as claimed in claim 1, wherein: said annular insert is constructed as an unitary body such that said annular insert, when mounted on said flanged pipe, is self supporting on said flanged pipe.

5. A plumbing assembly as claimed in claim 4, wherein:

said annular insert is installed on said flanged pipe by disposing said annular insert such that a plane defined by a face of said annular insert is perpendicular to and is moved in a direction of the longitudinal axis of said flanged pipe.

6. A plumbing assembly as claimed in claim 5, wherein the installed annular insert is slidable longitudinally along the length of said flanged pipe.

7. A plumbing assembly for fluidly coupling a flanged pipe having an annular flange defining an annular flat sealing face, to a threaded pipe having an externally threaded end portion including a sealing face which defines an annular groove, comprising:

an annular nut having an internal thread for engaging the threaded pipe, a minimum internal diameter sized greater than an external diameter of the flange of the flanged pipe such that said annular nut can slide without deformation over the flange, and defining a retaining surface;

an annular insert having a minimum internal diameter sized less than the external diameter of the flange of the flanged pipe such that said annular insert cannot freely slide over said flange of said flanged pipe, said annular insert having a split that allows said annular insert to undergo uniform elastic deformation and slip over said flange of said flanged pipe and then return to an undeformed annular shape, said annular insert including an annular extension portion bearing against the retaining surface of said annular nut and the flange of the flanged pipe when said annular nut and said annular insert have both been slid over said flange of said flanged pipe and said annular nut is threadedly engaged with the threaded pipe, said annular insert securing said annular nut from sliding over the flange of the flanged pipe said annular extension portion of the insert having an outside diameter that is substantially equal to an inside diameter of the nut; and a gasket defining an annular flat sealing side and an opposite side having an integral annular sealing projection, said gasket being positionable so that the flat sealing side of the gasket seals against the flat sealing face of the flange of said flanged pipe and the annular sealing projection is received within and seals against the annular groove of said threaded pipe.

8. A plumbing assembly as claimed in claim 7, wherein:

said annular nut has a large internal diameter section and a small internal diameter section, said large internal diameter section defining the internal thread for threadable engagement to the externally threaded end of the threaded pipe, said small internal diameter section defining the retaining surface.

9. A plumbing assembly as claimed in claim 7, wherein:

said gasket is made of elastomeric material, the sealing projection of said gasket defining a partially circular cross section.

10. A plumbing assembly for interfacing a flanged pipe defining a longitudinal axis and having an annular flange to a mating fitting defining an engaging surface, comprising:

an annular nut having a minimum internal diameter that is greater than an outside diameter of the flange of the flanged pipe, so that the nut can slide without deformation over the flange of said flanged pipe, the nut including a bearing surface and said nut defining a mating engaging surface for engagement with the engaging surface of the mating fitting;

retention means for retaining said nut on said flanged pipe and having an internal diameter such that said retention means cannot freely slide over said flange of said flanged pipe, said retention means defining an annulus having a split permitting uniform elastic deformation and, therefore, reversible expansion of said retention means over said flange of said flanged pipe, said retention means being positionable to bear against said bearing surface of said annular nut and said flange of said flanged pipe when said annular nut and said retention means have both been slid over said flange of said flanged pipe whereby said retention means is restricted from expanding and secures said annular nut from sliding over said flange of said flanged pipe, wherein said retention means defines an integral flat annular bearing face that is normal to the axis of the pipe and which bears against the flange and includes an annular extension portion defining an outside diameter that is substantially equal to an inside diameter of the engaging surface of the nut and that is slidably and closely received within the engaging surface of the nut.

11. A plumbing assembly as claimed in claim 10, wherein:

said annular nut having a large internal diameter section and a small internal diameter section, said large internal diameter section defining said mating engagement surface for engagement to said engaging surface of said mating fitting, said small internal diameter section defining said bearing surface.

12. The plumbing assembly of claim 10, wherein said retention means is formed from a resilient structural material.

\* \* \* \* \*

UNITED STATES PATENT AND TRADEMARK OFFICE
CERTIFICATE OF CORRECTION

PATENT NO. : 5,775,743
DATED : July 7, 1998
INVENTOR(S) : G.P. Rochelle

It is certified that error appears in the above-identified patent and that said Letters Patent is hereby corrected as shown below:

COLUMN     LINE

5              36            after "pipe" insert --,--
(Claim 7,    line 27)

Signed and Sealed this

Twelfth Day of January, 1999

Attest:

Attesting Officer         Acting Commissioner of Patents and Trademarks